United States Patent [19]

Jonelis

[11] 4,301,343
[45] Nov. 17, 1981

[54] METHODS AND ASSEMBLIES FOR MOUNTING PARTS

[75] Inventor: John A. Jonelis, Indianapolis, Ind.

[73] Assignee: Western Electric Company, Incorporated, New York, N.Y.

[21] Appl. No.: 161,635

[22] Filed: Jun. 20, 1980

[51] Int. Cl.³ .................. H01H 1/26; B23K 19/04; B29C 27/08
[52] U.S. Cl. ...................... 200/283; 29/622; 29/878; 29/882; 156/73.1; 156/293; 179/158 R; 200/1 A; 200/303; 264/23
[58] Field of Search .............. 156/73.1, 73.5, 293, 156/580.1, 580.2; 228/1 R; 29/622, 878, 882; 200/1 A, 283, 293, 303; 264/23, 249; 179/158 R

[56] References Cited
U.S. PATENT DOCUMENTS

| | | | |
|---|---|---|---|
| 3,485,982 | 12/1969 | Maire | 156/73.1 |
| 3,499,809 | 3/1970 | Wysong | 156/73.1 |
| 3,702,981 | 11/1972 | Wahnschaffe | 200/283 |
| 3,705,380 | 12/1972 | Roberts | 29/622 |
| 3,806,386 | 4/1974 | Burke et al. | 156/73.1 |
| 3,944,261 | 3/1976 | Reed et al. | 156/73.1 |
| 4,046,610 | 9/1977 | Lilja | 156/73.1 |
| 4,083,023 | 4/1978 | Cherny et al. | 200/283 |

*Primary Examiner*—Michael G. Wityshyn
*Attorney, Agent, or Firm*—J. L. Landis

[57] ABSTRACT

A piece part, such as a flat metal contact spring (12), is mounted between two plastic details (11 and 25), so that an end portion of the spring 12 projects from the mounting details. One of the details, such as a base member 11, has a cavity 17 within which the spring is placed so that a mounting section (12A) fits within the cavity. The second detail, such as a thermoplastic locking insert 25, includes a finger 25B adapted to fit in the cavity adjacent to the spring section (12A). The insert is provided with pointed energy directors (30 and 31) arranged so that the members can be heated and compressed together, and the directors melt to weld the parts together. The insert and/or the base member is formed with slots (33) so positioned that portions of the molten plastic are forced to flow into the slots during the process so as to encapsulate the mounting section of the spring or other piece part in the plastic.

33 Claims, 9 Drawing Figures

METHODS AND ASSEMBLIES FOR MOUNTING PARTS

TECHNICAL FIELD

This invention relates generally to techniques and constructions for mounting a portion of an elongated piece part between a base member and a thermoplastic insert member, and to asemblies so produced. More particularly, the invention relates to the mounting of a metal piece part between two plastic locking details so that an end portion of the piece part projects from the locking details; for example, in the fastening of portions of flat contact springs in a plastic mounting frame for use in switch contact assemblies. The invention also relates to improved plastics welding techniques, particularly ultrasonic welding and mounting processes for making such assemblies.

BACKGROUND OF THE INVENTION

In the manufacture of switch assemblies, such as used in multifrequency telephone pushbutton dial assemblies, a plurality of flat contact springs are mounted near one end between two mating plastic details so that a contact end of each spring projects from a mounting section secured between the plastic details. In the past, it has been customary to mount the springs at predetermined locations within a cavity formed in a plastic mounting frame, and then to weld a thermoplastic locking insert to the frame so as to fasten the mounting section of each spring between the two mounting details. The locking insert is formed with a flat top portion and a depending finger portion that fits closely within the cavity so that the spring section fits closely between an outer wall of the finger and an inner wall of the cavity.

The insert is formed with V-shaped "energy directors" (pointed teeth) along portions of the under surface thereof, which fit against flat surface areas of the frame. After the insert is preassembled with the frame, ultrasonic energy is applied to the members while squeezing the parts together, so that the plastic melts, starting at the tips of the energy directors, and the melted plastic surface bonds the two plastic details together, similarly to seam selding, at the regions where the energy directors are placed.

In this prior art method, the contact springs are secured in place only by using close fitting plastic parts and, if the finger member is too small with respect to the cavity, the spring can move longitudinally or vertically in some cases; if too large, the parts either cannot be assembled, or where they can, the wall of the cavity is deformed as pressure is applied, which operates to misalign the contact end of the spring.

SUMMARY OF THE INVENTION

A specific object of this invention is to provide improved locking insert constructions and methods of assembly of the type described, in which the spring sections are securely locked between the plastic details and to obviate the requirement for a tight-toleance fit between the finger and the cavity.

More general objects are to provide improved processes and assemblies for mounting piece parts between mounting details, and particularly for encapsulating a mounting section of the part in melted plastic to provide a secure lock.

Another object is to provide improved ultrasonic plastics-welding processes and assemblies, particularly for securely mounting a section of an elongated piece part between two interfitting plastic details so that an end portion of the piece part extends from the mounting details.

With the foregoing and other objects in view, methods and apparatus in accordance with certain features of the invention are designed for mounting a section of an elongated piece part between a base member and an insert member having a mounting portion designed to fit into a cavity in the base member so as to position the mounting section of the piece part between the mounting portion of the insert member and a wall of the cavity. In accordance with the improved construction and method, thermoplastic portions of the insert member adjacent to the base member are melted, while simultaneously forcing the members together so that portions of the molten plastic are forced to flow into at least one slot formed in one of the members adjacent to the mounting section of the piece part. This action functions to encapsulate the mounting section of the piece part between the members in flowed plastic, in addition to welding portions of the members together. The invention also relates to piece part constructions useful in making such assemblies, and to completed assemblies so formed.

In one example, the piece parts are flat rectangular contact springs, each of which is arranged to be secured near one end between portions of a molded plastic base frame and a thermoplastic locking insert. The insert has depending rectangular fingers arranged to fit into rectangular receiving cavities formed in the upper surface of the frame where the fingers are to be mounted, and the flat rectangular springs are mounted. The fingers are formed with vertical rectangular slots having U-shaped cross sections facing the adjacent springs. Portions of the under surface of the insert are formed with pointed energy directors, particularly having portions arranged adjacent to entry portions of the slots such that molten plastic formed during an ultrasonic melting step is forced into the slots to positions where it encapsulates the mounting portions of the springs.

Other objects, advantages and features of the invention will be apparent from the following detailed description of a specific embodiment thereof, when read in conjunction with the appended drawings.

DETAILED DESCRIPTION

Figure 1:
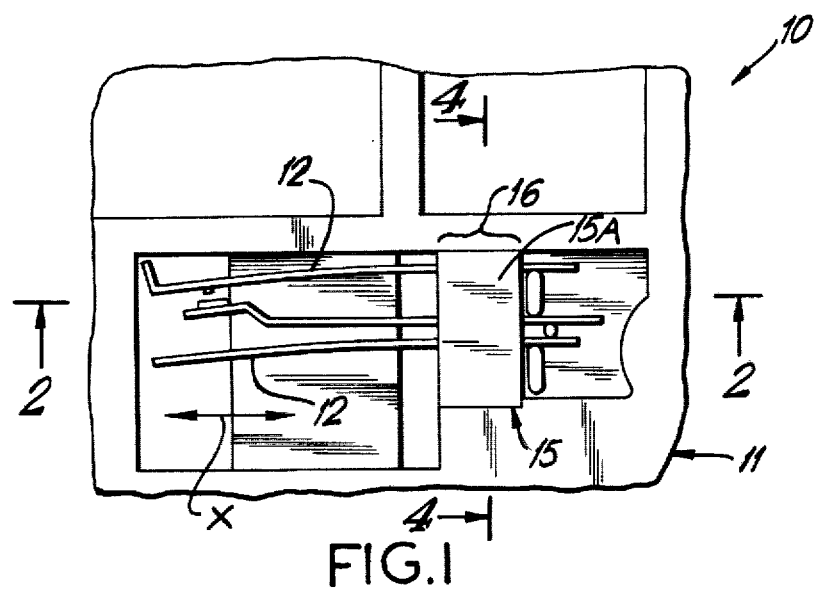
FIG. 1 is a plan view of a portion of dial switch assembly, illustrating a set of contact springs fastened in a mounting frame by a thermoplastic locking insert.
Figure 2:
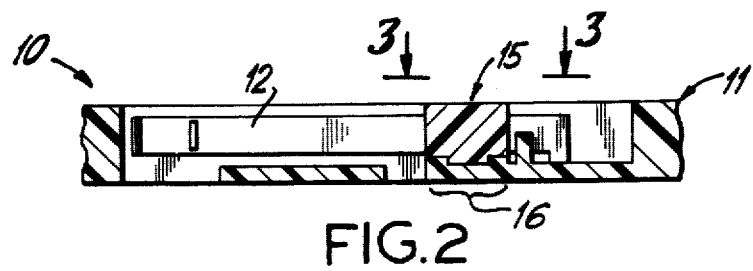
FIG. 2 is a vertical cross section of the assembly, along line 2—2 of FIG. 1.

Referring now in detail to the drawings, and particularly to FIGS. 1-2, a method and assembly in accordance with the specific embodiment of the invention is designed for securely fastening portions of an elongated piece part between a pair of mating plastic details, in the manufacture of a multifrequency telephone dial switch assembly 10. In this example, the assembly 10 includes a molded thermoplastic mounting frame 11, in which a plurality of flat metal contact springs 12—12 are mounted in spaced, generally parallel relationship as illustrated in FIG. 1. The springs are mounted in the frame 11 by a thermoplastic locking insert 15 that is shaped to fit into a spring mounting section 16 of the frame and has portions that are melted to bond portions of the insert to adjacent portions of the frame. With this arrangement, an intermediate mounting section of each spring is fastened between the fitting, bonded plastic parts 11 and 15, so that the ends of the contact springs extend outwardly from the mounting section 16 and can flex about the mounting section, as is well known, to serve as a switch contact for a telephone dialing assembly.

An improved method and assembly in accordance with the specific embodiment of the invention, as illustrated in FIGS. 6-9, is designed for mounting elongated piece parts, such as the flat metal contact springs 12, between mating plastic details, such as 11 and 15, and for securely fastening a mounting section of each spring between the plastic details. Before describing the improved method and assembly, the following paragraphs describe a prior-art commercial process of manufacturing these assemblies.

Prior-Art Process

Figure 3:
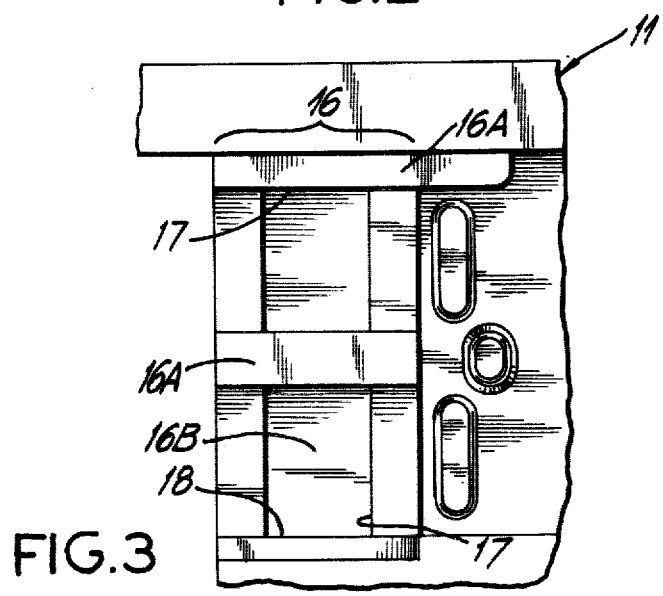
FIG. 3 is an enlarged top view of a spring-mounting section of the frame, looking generally along line 3—3 of FIG. 2 but with the contact springs and the locking insert removed.
Figure 4:
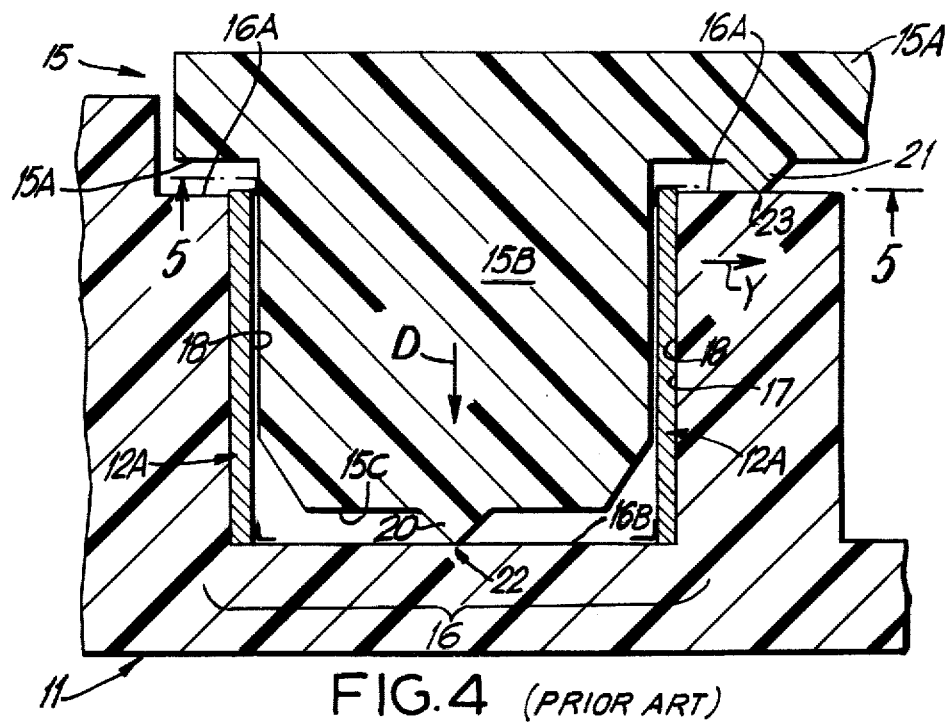
FIG. 4 is a fragmentary vertical section along line 4—4 of FIG. 1, illustrating the arrangement of assembly details in a prior-art process, just prior to bonding the insert to the frame.
Figure 5:
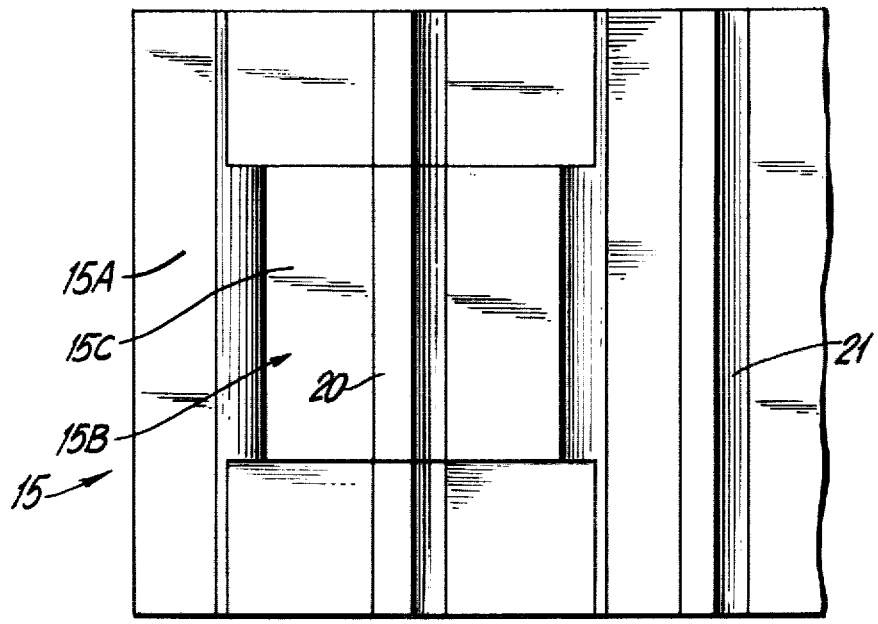
FIG. 5 is a worm's eye view of the bottom surface of the insert in FIG. 4, looking along line 5—5 of FIG. 4.

Referring to FIGS. 3-5, a prior art version of the insert 15 and method of assembly are illustrated. In this arrangement, the mounting section 16 of the frame includes a plurality of rectangular vertical cavities 17, within which the mounting sections (12A) of a pair of the springs 12 are positioned on edge as shown in FIG. 4, so that mounting sections 12A are positioned adjacent to flat outer walls 18 of the cavities 17. The insert 15 includes a flat, rectangular horizontal top section 15A designed to fit against and to be welded to flat upper surfaces 16A of the mounting section 16, and a plurality of depending rectangular fingers 15B designed to fit into the cavities 17 in close proximity to the inner surfaces of the spring sections 12A in the cavities. A lower, generally flat end surface 15C of each finger 15B is designed to fit against and to be welded to a flat bottom wall 16B of the cavity 17.

In operation, the contact springs 12 are placed in the desired positions in the cavity 17, as illustrated, the insert 15 is then lowered into engagement with the frame 11 to the partially assembled position of FIG. 4, in which each finger 15B is inserted into the corresponding cavity 17 and the springs 12 are positioned between the outer walls of the finger 15B and the adjacent walls 18 of the cavity 17. In this position, a set of pointed, triangular energy director sections 20 and 21 formed along the flat under surface 15C of the finger 15B (section 20) and along the under surface of horizontal top section 15A (section 21) engage correspondingly line-contact regions 22 and 23 along the frame surfaces 16B and 16A.

Following this, the insert 15 is bonded to the frame 11 by a conventional ultrasonic plastic-welding process, in which the insert 15 is forced downward against the frame 11 (arrow D) and ultrasonic energy is applied to the assembly so as to melt and fuse the plastic material of the pointed energy directors 20 and 21, thus to form a series of plastic welds at the regions 22-23, similar to seam welds. It is conventional that plastic parts to be so welded be formed with pointed triangular sections, such as 20-21, which serve as energy directors that initiate plastic melting at the desired areas.

It should be noted that, in this prior-art process, the only fusing between the plastic parts is along the melted weld lines 20-22 and 21-23. Thus, the springs 12 are secured between the plastic parts 11 and 15 only by the use of relatively close-fitting plastic details, such as 11 and 15, that are seam welded together. Obviously, this requires very close tolerances between the widths of the fingers 15B and cavity 17, and the thickness of the springs 12. If, for example, a finger 15B is slightly undersized, the springs are not tightly secured against lengthwise horizontal movement (arrow X in FIG. 1), and in some cases can also shift or pivot vertically between the parts. If a finger 15B is slightly oversize, it can deform the adjacent wall section 18 of the frame 11 slightly outward (arrow Y in FIG. 4) when the fingers are inserted, thus causing misalignment of the contact tips at the ends of the springs.

Improved Process and Assembly Structure

Referring now to FIGS. 6-9, an improved method of assembly and structure in accordance with a specific embodiment of this invention are illustrated. In this example, an improved insert 25 is formed with a flat rectangular top section 25A (similar to 15A) and depending finger sections 25B corresponding in function to 15B) that are inserted into the cavities 17 in the frame 11 so as to locate and position the springs 12—12 between the outer walls of each finger 25B and the inner walls 18 of the companion cavity 17, as described in the preceding section. As in the prior-art process described above, an energy director section (30) is provided at the bottom of each finger 25B, designed to engage the bottom wall 16B of the frame 11, and an energy direction section (31) is provided along the under surface of the top section 25A for engaging the upper surface 16A of the frame. In the improved structure, the energy directors have been greatly expanded in number and size, and are arranged to provide a greatly increased flow of plastic, particularly in the regions bordering the spring sections 12A, so as to encapsulate the spring sections 12A in molten plastic between the insert 25 and the frame 11, as described in the following paragraphs.

Figure 6:
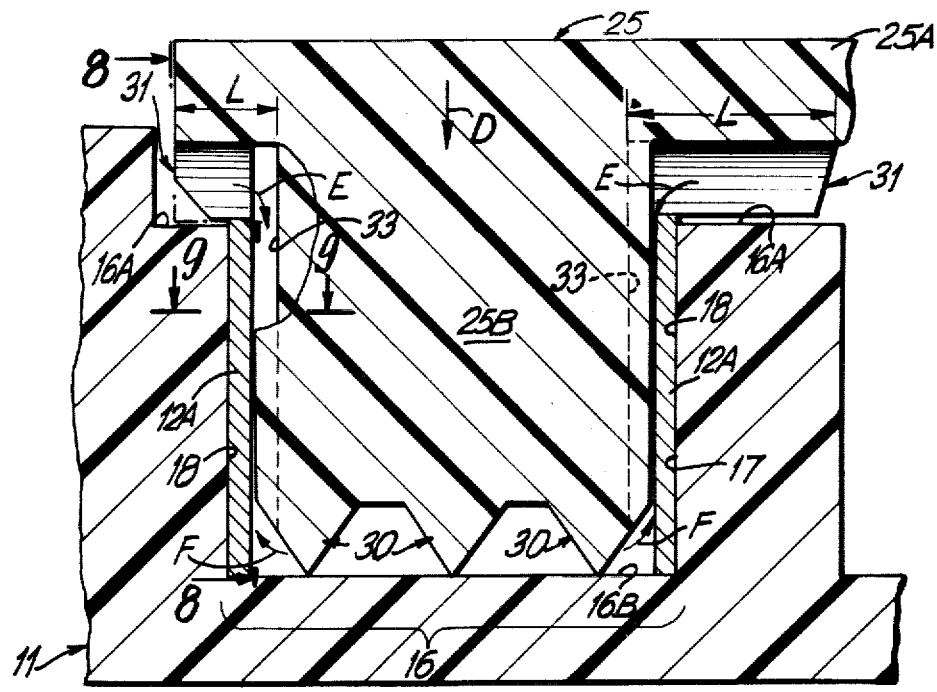
FIG. 6 is a vertical section similar to FIG. 4, but illustrating an improved locking insert in accordance with one specific embodiment of this invention.
Figure 7:
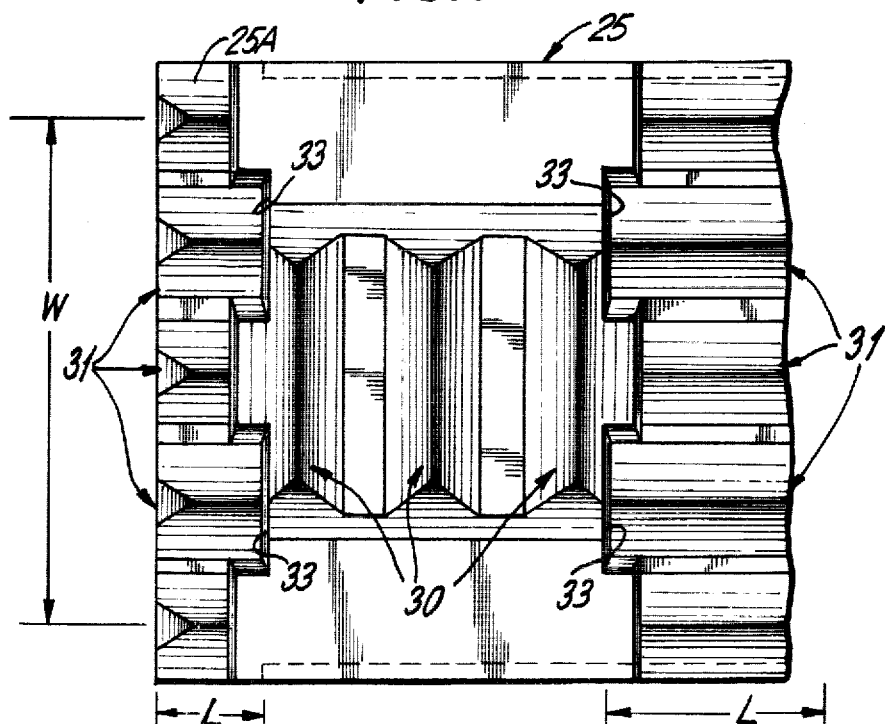
FIG. 7 is a bottom view of the improved insert of FIG. 6.
Figure 8:
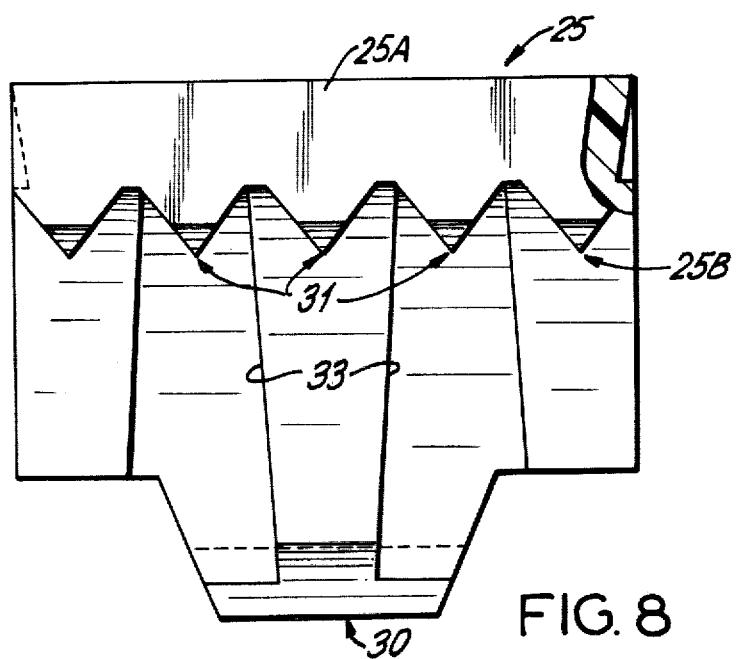
FIG. 8 is a side view of the insert, along line 8—8 of FIG. 6.
Figure 9:
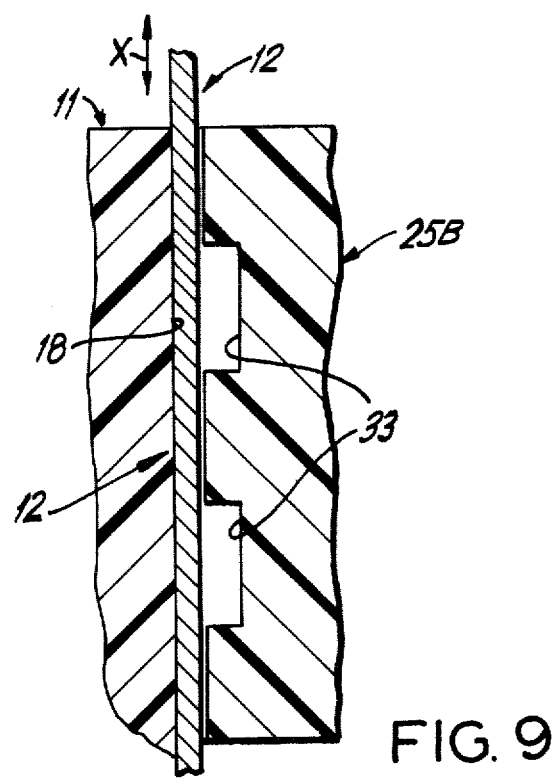
FIG. 9 is a fragmentary horizontal section along line 9—9 of FIG. 6, illustrating a set of slots formed in the insert for receiving molten plastic to encapsulate the mounting sections of the springs.

For this purpose, each depending finger section 25B is formed with a set of vertical slots 33 having rectangular U-shaped cross sections as illustrated particularly in FIGS. 7 and 9, two slots 33 on each side in the example illustrated, extending from the top to the bottom of the finger section and facing the adjacent spring section 12A on each side. With this arrangement, molten plastic is forced into the slots 33 as the welding process proceeds, as indicated by arrows E (top) and F (bottom) to encapsulate the spring-mounting sections 12A in molten plastic. As illustrated in FIGS. 6-8, the energy directors 31 at the top are formed as parallel rows of elongated triangular teeth (five in the example illustrated), running perpendicularly to the springs 12—12 from left to right in FIGS. 6-7. Each director 31 is formed with a length L, extending from a point near the outer ends of the adjacent mounting surface 16A toward the center of the finger 25B to a position aligned with the upper end of one of five slots 33. The set of firve directors 31 span a width W covering the entire width of the contact spring section 12A in the cavity 17 to be encapsulated. Also, as can be appreciated by comparing FIGS. 6-7 with FIGS. 4-5, the cross sectional area, and thus volume, of each director 31 in the improved construction is substantially larger than that used in the prior-art seam weld version; for example, 280% larger in volume of plastic for each director to be melted in one specific example. Also, as mentioned, the number of directors 31 at the top has been increased on each side, as from one to five, so as to further multiply the volume of available plastic, such as by 586% in one example.

With this arrangement, as the welding operation proceeds, the directors 31 melt so as to weld the under surface of the top portion 25A of the insert to the upper surfaces 16A of the frame 11 in the same manner previously described. In addition, as the directors melt, molten plastic is forced to flow inwardly and downwardly (arrows E) along the slots 33, thus filling the upper portions of the spaces between the spring section 12A and the adjacent surfaces of the insert 25.

In addition, the energy directors 30 at the bottom are made similarly larger and more numerous that, as the plastic melts and the pieces 25 and 11 are pressed together, molten plastic from the lower directors 30 is forced outward and upward according to arrows F so as to fill the lower portions of the slots 33 with molten plastic from the bottom. In the example illustrated, three large triangular directors 30—30 are formed along the bottom of the finger 25B, running parallel to the springs 12—12. With these arrangements, the spring mounting sections 12A are embedded in the flowed plastic in the slots 33 and between the facing surfaces of the details 25 and 11, so as to effectively encapsulate the spring mounting sections 12A in the melted plastic, in addition to welding the parts together as in the prior process.

One important advantage of the improved process is that, by so encapsulating the spring mounting sections 12B, the dimensional tolerances between the fingers 25B and the cavities 17 are no longer critical, and the loose or bent spring problems discussed above are no longer encountered. This follows because the springs are now embedded securely in place by the melted plastic in the slots 33 rather than relying on a tight fit between the parts as in the prior process.

In view of the foregoing description, it should be apparent that there has been provided a low cost, simple and effective method of securely locking a mounting section of a piece part between two mounting details, in which the mounting section is securely embedded in plastic by encapsulation during the plastic-melting-/welding process. While one specific embodiment of the invention has been described in detail above, it should be apparent that various modifications may be made from the specific details described without departing from the spirit and scope of the invention. In particular while the invention has been described in accordance with the preferred embodiment illustrated as including a slotted insert member (25) with energy directors (30, 31) formed along facing portions of the under surfaces thereof, it should be apparent that the invention could also be practiced with the slots, such as 33, formed in the wall 18 of the cavity, or slots formed in both members 25 and 11. Also, some or all of the energy directors could be formed along upper surfaces of the base member 11 instead of or in addition to forming directors along the bottom surfaces of the insert member, the main point being the provision of one or more slots facing the mounting section (12A) of the piece part in the cavity, in combination with one or more meltable thermoplastic elements on one of the facing members arranged so that sufficient molten plastic will flow into the slots to encapsulate the mounting section between the members, as described above.

Of course, it should be understood that words of location and orientation such as "horizontal," "vertical," "top," "bottom," "under surface," etc., are intended in an exemplary sense and are not intended to limit the invention to any particular direction in which the parts may be turned.

What is claimed is:

1. An improved method of mounting a section of an elongated piece part between a base member and a thermoplastic insert member having a mounting portion designed to fit into a cavity in the base member so as to position the mounting section of the piece part between the mounting portion of the insert member and a wall of the cavity, the insert member being subsequently welded to the base member, the improved method comprising:
   ultrasonically melting portions of the insert member adjacent to the base member, while simultaneously forcing the members together so that portions of the molten plastic flow into at least one slot formed in one of the members adjacent to the mounting section of the piece part to encapsulate the mounting section between the members in flowed plastic, wherein the insert member is formed with pointed, thermoplastic energy directors along portions of the inner surface facing flat adjacent surfaces of the base members, at least portions of the directors being positioned adjacent to an end of each slot so that molten plastic from the directors flows into each slot during the melting step.

2. A method as recited in claim 1, wherein the base member is a thermoplastic member and the piece part is an elongated metal member.

3. A method as recited in claim 2, wherein the piece part is a flat metal spring.

4. A method as recited in claim 3, wherein the cavity is a vertical rectangular cavity in which the spring is placed on edge with the mounting section of the spring adjacent to a wall of the cavity, and wherein the insert member is a molded plastic detail formed with a flat top section designed to fit against flat upper surfaces of the base member and with a depending rectangular finger comprising the mounting portion and designed to fit into the cavity in close proximity to the inner surface of the spring mlunting section placed in the cavity, the finger being formed with at least one vertical slot having a U-shaped cross section facing the adjacent spring section and into which the plastic flows during the melting step.

5. An assembly fabricated in accordance with the method of any of claims 1-4.

6. A method as recited in any of claims 1-4, wherein each slot is formed to extend the entire length of the mounting portion of the insert member in the cavity, and wherein the insert member is formed with at least two sets of energy directors positioned at different areas and adjacent to both ends of each slot so that molten plastic is forced into each slot from both ends thereof during the melting step.

7. An assembly fabricated in accordance with the method of claim 6.

8. A method of mounting a section of a flat metal spring between a thermoplastic base frame and a thermoplastic locking insert, which comprises:
   (a) positioning the spring, on edge, in a rectangular, vertical mounting cavity formed in the frame so that a mounting section of the spring fits against a flat side wall of the cavity and an end portion of the spring extends from the cavity;
   (b) assembling the locking insert with the frame so that a flat top section of the insert fits against flat horizontal upper surfaces of the frame and so that a rectangular finger portion of the insert fits into the cavity so as to position the spring mounting section in close proximity between a flat outer surface of the finger portion and a flat wall portion of the cavity; and
   (c) ultrasonically heating the parts, while forcing them togehter so that energy director sections formed along portions of the under surface of the insert melt to weld the facing plastic parts together and further so that portions of the molten plastic flow inwardly along vertical slots formed in the outer surface of the finger portion so as to encapsulate portions of the spring between the finger portion and the cavity wall in the flowed plastic.

9. A method as recited in claim 8, wherein the insert is formed with a first set of energy directors in the form of pointed triangular teeth running horizontally along the under surface of the top section of the insert and occupying positions adjacent to the upper ends of the slots so that molten plastic from the first set of energy directors is forced inward and downward into the upper ends of the slots during the heating and forming step; and
   wherein the insert is formed with a second set of energy directors in the form of pointed triangular teeth running horizontally along the under surface of the finger portion adjacent to the bottom wall of the cavity and arranged adjacent to the lower ends of the slots so that molten plastic from the second set of energy directors flows inward and upward into the slots from the lower ends of the slots during the heating and forming step.

10. A method as recited in claim 9, wherein a plurality of springs are simultaneously mounted in generally parallel relationship in a plurality of cavities in a base frame, using an insert member having a flat rectangular top section spanning the area of the cavities and having a plurality of depending finger portions, each of which is arranged to fit closely into a corresponding one of the cavities.

11. An assembly fabricated in accordance with the method of any of claims 8-10.

12. A kit of component parts capable of being assembled together for mounting a section of an elongated piece part between said component parts, which comprises the combination of:
   a base member having a cavity in which the mounting section of the piece part is adapted to be received; and
   an insert member having a mounting portion shaped to fit into the cavity so as to position the mounting section of the piece part between the mounting portion of the insert member and a wall of the cavity;
   at least one of the members having thermoplastic portions formed along a surface thereof adjacent to the other member and adapted to be melted, while simultaneously forcing the members together so as to weld the two members together;
   at least one of the members having a slot formed adjacent to the mounting section of the piece part between the members and arranged so that portions of the molten plastic flow into the slot when the thermoplastic portions are melted to encapsulate the mounting section of the piece part between the members in flowed plastic.

13. A kit of parts as recited in claim 12, wherein the base member and the insert member are thermoplastic members and the piece part is an elongated metal member.

14. A kit of parts as recited in claim 13, wherein the piece part is a flat metal spring.

15. A kit of parts as recited in claim 14, wherein the cavity is a vertical rectangular cavity in which the spring is placed on edge with the mounting section of the spring adjacent to a wall of the cavity, and wherein the insert member is a molded plastic detail formed with a flat top section designed to fit against flat upper surfaces of the base member and with a depending rectangular finger comprising the mounting portion and adapted to fit into the cavity in close proximity to the inner surface of the spring mounting section in the cavity, the finger being formed with at least one vertical, U-shaped slot facing the adjacent spring section and into which the plastic flows during the melting step.

16. A kit of parts as recited in any of claims 12-15, wherein the insert is formed with pointed, thermoplastic energy directors comprising the portions that are melted and extending along portions of the under surface facing flat adjacent surfaces of the base member, at least portions of the directors being positioned adjacent to an end of the slot so that molten plastic from the directors is adapted to flow into the slot during the melting step.

17. Apparatus as recited in claim 16, wherein the slot is formed to extend the entire length of the mounting portion of the insert member in the cavity, and wherein the insert member is formed with at least two sets of energy directors positioned at different areas adjacent to both ends of the slot so that molten plastic is adapted to be forced into the slot from both ends thereof during the melting step.

18. A kit of component parts capable of being assembled together for mounting a section of a flat metal spring between said component parts, which comprises the combination of:
   a thermoplastic base frame having a rectangular, vertical mounting cavity in which the mounting section of the spring is adapted to be placed, on edge, against a flat side wall of the cavity so that an end portion of the spring extends from the cavity; and
   a thermoplastic locking insert adapted to be assembled with the frame so that a flat top section of the insert fits against flat horizontal upper surfaces of the frame and so that a rectangular finger portion of the insert fits into the cavity so as to position the spring mounting section in close proximity between a flat outer surface of the finger portion and a flat wall portion of the cavity, the insert having energy director sections formed along portions of the under surface thereof and adapted to be ultrasonically heated, while forcing the insert and frame together so as to weld the insert and frame together, the insert further having vertical slots formed in the outer surface of the finger portion and arranged so that portions of the molten plastic flow into the slots when the director sections are melted so as to encapsulate portions of the mounting section of the spring between the finger portion and the cavity wall in the flowed plastic.

19. A kit of parts as recited in claim 18, wherein the insert is formed with a first set of energy directors in the form of pointed triangular teeth running horizontally along the under surface of the top section of the insert and occupying positions adjacent to the upper ends of the slots so that molten plastic from the first set of energy directors is adapted to be forced inward and downward into the upper ends of the slots when the plastic is melted; and wherein the insert is formed with a second set of energy directors in the form of pointed triangular teeth running horizontally along the under surface of the finger portion adjacent to the bottom wall of the cavity and arranged adjacent to the lower ends of the slots so that molten plastic from the second set of energy directors is adapted to flow inward and upward into the slots from the lower ends of the slots when the plastic is melted.

20. A kit of parts as recited in claim 19, wherein the frame is formed with a plurality of cavities in which a plurality of springs are adapted to be simultaneously mounted in generally parallel relationship; and wherein the insert member is formed with a flat rectangular top section spanning the area of the cavities and having a plurality of depending finger portions, each of which is arranged to fit closely into a corresponding one of the cavities.

21. An assembly comprising:
(a) a base member having a vertical cavity;
(b) an elongated flat contact spring having a mounting section positioned on edge in the cavity against a flat vertical wall thereof and having an end portion extending outward from the cavity; and
(c) a thermoplastic insert member welded to the base member and having a depending finger portion fitting in the cavity with a flat outer surface of the finger portion located in close proximity to the inner edge of the spring mounting section in the cavity so that the mounting section of the spring is sandwiched between the flat vertical wall of the cavity in the base member and the flat outer surface of the depending finger portion, the flat outer surface of the finger portion having at least one open-ended vertical slot facing the spring mounting section and filled with a sufficient volume of melted plastic to encapsulate the mounting section of the spring in the melted plastic so as to securely lock the mounting section of the spring between the insert member and the base member so that the end portion of the spring extends outward from the cavity.

22. An assembly as recited in claim 21, wherein the base member and the insert member comprise molded thermoplastic details.

23. An assembly as recited in claim 22, wherein the insert member is formed with a flat top section that fits against and is welded to flat upper surfaces of the base member adjacent to the periphery of the cavity, the finger portion depending from the top section and being formed with at least one vertical slot having a U-shaped cross section facing the spring mounting section and comprising each slot recited in claim 21.

24. An assembly as recited in claim 23, wherein the finger portion is further formed with a generally flat bottom surface that is welded to a flat bottom surface of the cavity.

25. An assembly as recited in claim 24, wherein the frame is formed with a plurality of cavities in which a plurality of the contact springs are mounted in generally parallel relationship; and wherein the flat top section of the insert is a rectangular section spanning the area of the cavities and having a plurality of the depending finger portions, each of which is received in a corresponding one of the cavities.

26. A thermoplastic insert member having component parts capable of being assembled with a base member so as to mount a section of an elongated piece part between the members, which insert member comprises:

a first portion having a flat working surface adapted to fit against a flat facing surface of the base member on assembly of the members;

a mounting portion extending from the first portion and adapted to fit into a cavity in the base member when the members are assembled, with the mounting section of the piece part being positioned between the outer surface of the mounting portion and a wall of the cavity upon assembly, the mounting portion having at least one open ended slot formed in the outer surface thereof and positioned adjacent to the mounting section of the piece part on assembly; and a plurality of meltable thermoplastic elements formed along the flat working surface of the insert member adjacent to the flat facing surface of the base member and having portions positioned adjacent to an open end of each slot and arranged so that, when the members are assembled with the piece part, the insert member is adapted to be heated ultrasonically, while forcing the members together so that the thermoplastic elements melt and portions of the molten plastic flow into each slot to encapsulate the mounting section of the piece part between the members in flowed plastic, wherein the thermoplastic elements include a first set of pointed triangular energy directors running along the working surface of the insert member and occupying positions adjacent to an open end of each slot so that molten plastic from the first set of energy directors is adapted to be forced inward into an open end of each slot when the plastic is melted.

27. An insert member as recited in claim 26, wherein:
the first portion comprises a flat horizontal top section adapted, on assembly, to fit against flat upper surfaces of the base member bordering the cavity;
the mounting portion comprises a rectangular finger depending from the top section and adapted, on assembly, to fit within a vertical rectangular cavity formed in the base member in close proximity to the mounting section of the piece part so that the mounting section is sandwiched between the flat outer surface of the finger and a flat wall portion of the cavity.

28. An insert member as recited in claim 27, wherein each slot comprises a vertical peripheral slot having a U-shaped cross section running the length of the finger and facing the mounting section of the piece part in the cavity on assembly.

29. An insert member as recited in claim 28, wherein the first set of pointed triangular energy directors run horizontally along the under surface of the top section of the insert and occupy positions adjacent to the upper end of each slot so that molten plastic from the first set of energy directors is adapted to be forced inward and downward into the upper end of each slot when the plastic is melted.

30. An insert as recited in claim 29, wherein the insert is further formed with a second set of pointed triangular energy directors running horizontally along a flat under surface of the finger adjacent to a flat bottom wall of the cavity on assembly, arranged adjacent to the lower end of each slot so that molten plastic from the second set of energy directors is adapted to flow inward and upward into each slot from the lower end thereof when the plastic is melted.

31. An insert member as recited in claim 30, wherein the first set of energy directors runs perpendicular to the long axis of the piece part, the piece part being an elongated flat metal contact spring that is adapted to be mounted on edge near one end thereof between the insert member and the base member.

32. An insert member as recited in claim 31, wherein the second set of energy directors runs parallel to the long axis of the spring.

33. An insert member as recited in claim 32, for use in assembling a plurality of contact springs with a base member having a plurality of cavities in which a plurality of the springs are adapted to be simultaneously mounted in generally parallel relationship, wherein the top section of the insert member comprises a flat rectangular top section spanning the area of the cavities and having a plurality of depending fingers, each of which is adapted to fit closely into a corresponding one of the cavities so as to mount one or more of the springs in each cavity.

* * * * *